United States Patent
Desikan et al.

(10) Patent No.: US 8,036,933 B2
(45) Date of Patent: *Oct. 11, 2011

(54) SYSTEMS AND METHODS FOR PROVIDING ADVERTISEMENTS IN A COMMUNICATIONS NETWORK

(75) Inventors: Pavan Kumar Desikan, San Jose, CA (US); Amit J. Patel, Saratoga, CA (US); Gokul Rajaram, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/964,186

(22) Filed: Dec. 9, 2010

(65) Prior Publication Data

US 2011/0078022 A1 Mar. 31, 2011

Related U.S. Application Data

(63) Continuation of application No. 10/732,366, filed on Dec. 11, 2003, now Pat. No. 7,873,536.

(51) Int. Cl.
*G06Q 30/00* (2006.01)

(52) U.S. Cl. ...................................... 705/14.1

(58) Field of Classification Search .................. 705/14
See application file for complete search history.

(56) References Cited

U.S. PATENT DOCUMENTS

| | | |
|---|---|---|
| 5,848,396 A | 12/1998 | Gerace |
| 7,043,471 B2 | 5/2006 | Cheung et al. |
| 7,054,857 B2 | 5/2006 | Cunningham et al. |
| 7,065,500 B2 | 6/2006 | Singh et al. |
| 7,136,875 B2 | 11/2006 | Anderson et al. |
| 7,225,184 B2 | 5/2007 | Carrasco et al. |
| 7,231,395 B2 * | 6/2007 | Fain et al. ............................. 1/1 |
| 7,284,008 B2 | 10/2007 | Henkin et al. |
| 7,295,996 B2 | 11/2007 | Skinner |
| 7,373,599 B2 | 5/2008 | McElfresh et al. |
| 2005/0027699 A1 * | 2/2005 | Awadallah et al. ............... 707/3 |
| 2005/0131758 A1 | 6/2005 | Desikan et al. |

* cited by examiner

*Primary Examiner* — Namrata Boveja
*Assistant Examiner* — M Hamilton
(74) *Attorney, Agent, or Firm* — Harrity & Harrity, LLP

(57) ABSTRACT

A system provides advertising links. The system may received a query and provide a number of advertising links in response to the query. The number of advertising links may be dynamically adjusted based at least in part on the commercial-ness of the query. The display format of the advertising links may also be altered based at least in part on the commercial-ness of the query.

20 Claims, 9 Drawing Sheets

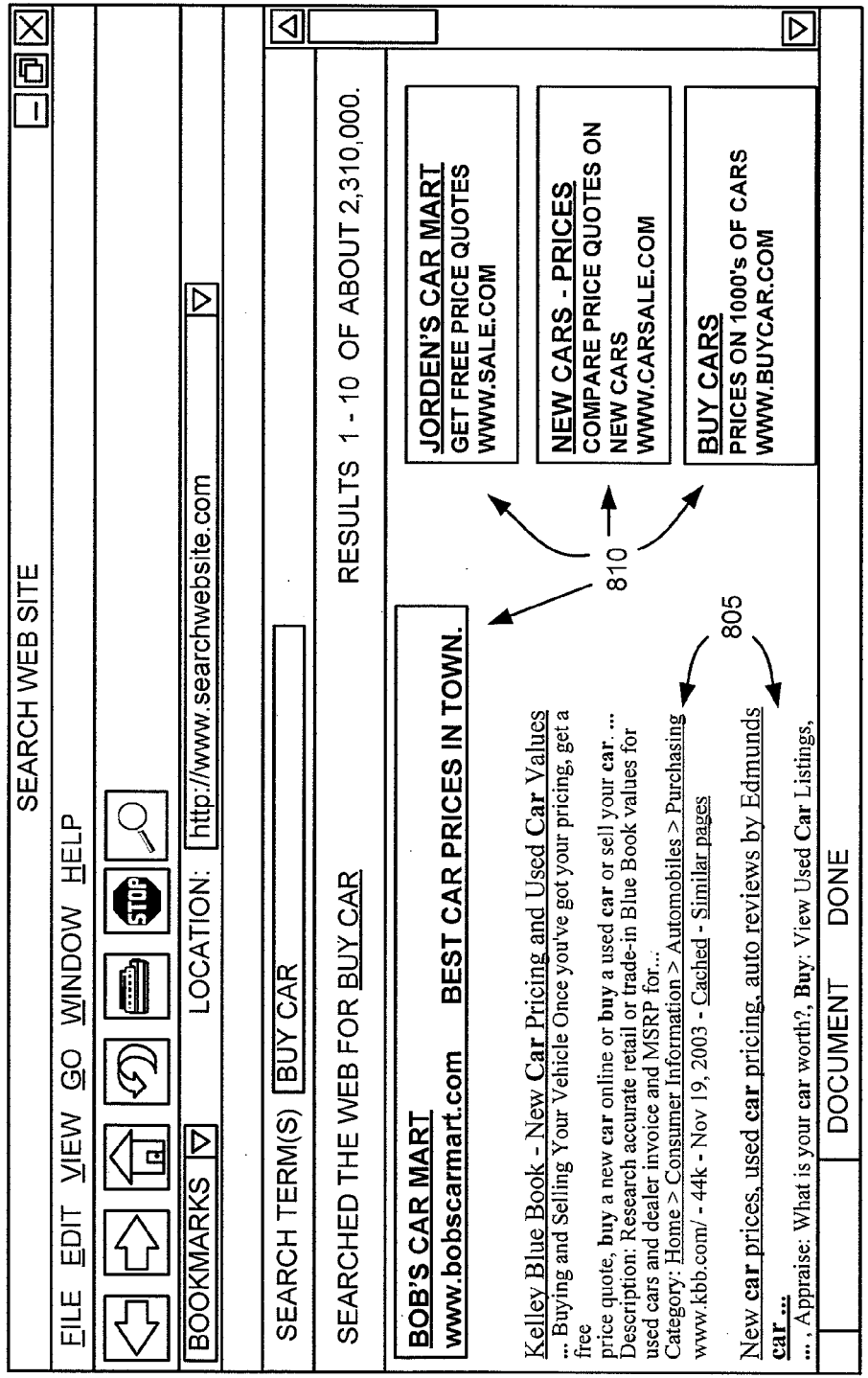

SYSTEMS AND METHODS FOR PROVIDING ADVERTISEMENTS IN A COMMUNICATIONS NETWORK

RELATED APPLICATION

This application is a continuation of U.S. patent application Ser. No. 10/732,366, filed Dec. 11, 2003, which is incorporated herein by reference.

FIELD OF THE INVENTION

The present invention relates generally to communication systems and, more particularly, to systems and methods for providing advertisements in a communications network.

BACKGROUND OF THE INVENTION

Networks, such as the Internet, have become an increasingly important part of our everyday lives. Millions of people now access the Internet on a daily basis to shop for goods and services, obtain information of interest (e.g., movie listings, news, etc.), and communicate with friends, family, and co-workers (e.g., via e-mail or instant messaging).

Currently, when a person wishes to purchase a product or simply find information on the Internet, the person enters into his/her web browser a Uniform Resource Locator (URL) pertaining to a web site of interest in order to access that particular web site. The person then determines whether the product or information of interest is available at that particular web site.

When the person does not know where to go to find, for example, a desired product, the person may "search" for web sites that sell the product using a search engine. For example, suppose a person wishes to purchase a laser printer via the Internet. The person may access a web site that includes a conventional search engine. The person may enter one or more terms relating to the product, such as "laser printer," into the search engine to attempt to locate web sites that sell that product. Searching for products or information of interest in this manner has become very popular.

Of all the queries received by a search engine, only a fraction of the queries are commercial queries, which are defined as queries where the user wants to conduct a transaction online (e.g., "Buy Diamond Jewelry"). Though small in terms of percentage, these commercial queries have the potential to account for a large fraction of the total revenue for the search engine, since many search engines depend on advertising for revenue. Therefore, it is desirable to determine a way to identify commercial queries, so that these queries can be better monetized.

Similarly, a small percentage of advertisements presented to users generate a large percentage of the revenue for the advertising server. Identifying these "commercial" advertisements allows for better placement and presentation of these advertisements, so that they can be even more successful. Also, there typically is limited space available to display advertisements for a given query. As such, it is desirable to display advertisements that are most likely to maximize revenue, while still preserving the user experience.

Therefore, there exists a need for systems and methods for improving the provisioning of advertisements.

SUMMARY OF THE INVENTION

Implementations consistent with the principles of the invention detect whether search queries are commercial search queries. When a commercial search query is detected, a number of additional advertisements may be provided in addition to some minimum number if those additional advertisements are determined to contribute significant revenue. Alternatively, or in addition, the formatting of some or all of the advertisements may be changed when a commercial search query is detected.

In accordance with one implementation consistent with the principles of the invention, a method for providing advertising links is provided. The method may include receiving a query and providing a number of advertising links in response to the query. The number of advertising links may be dynamically adjusted based at least in part on the commercial-ness of the query.

In another implementation consistent with the principles of the invention, a method for providing advertising links is provided. The method may include retrieving a group of advertising links relating to a topic, where each of the advertising links is associated with a monetary value, and determining whether the topic is commercial. The method may further include providing a first number of advertising links and providing a second number of additional advertising links when the topic is determined to be commercial. The second number of additional advertising links may be dynamically adjusted based at least in part on the monetary values associated with the second number of advertising links.

In a further implementation consistent with the principles of the invention, a method for determining whether a query is commercial is provided. The method may include retrieving a group of advertising links relating to the query, where each of the advertising links is associated with a monetary value, adding the monetary values for the group of advertising links to obtain a total monetary value, and comparing the total monetary value to a threshold. The method may further include determining that the query is commercial when the total monetary value equals or exceeds the threshold.

In still a further implementation consistent with the principles of the invention, a method for providing advertising links is provided. The method may include receiving a query, determining whether the query is commercial, providing a first number of advertising links in a first display format when the query is determined to be non-commercial, and providing at least one advertising link in a second number of advertising links in a second, different display format when the query is determined to be commercial.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 8 illustrates an exemplary graphical user interface that may be provided to a user in an implementation consistent with the principles of the invention when a commercial query is detected.

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Implementations consistent with the principles of the invention receive a query and dynamically adjust the number of advertising links and/or the formatting of the advertising links to be displayed based at least in part on the commercialness of the query (i.e., whether the query is commercial in nature).

Exemplary System

Figure 1:
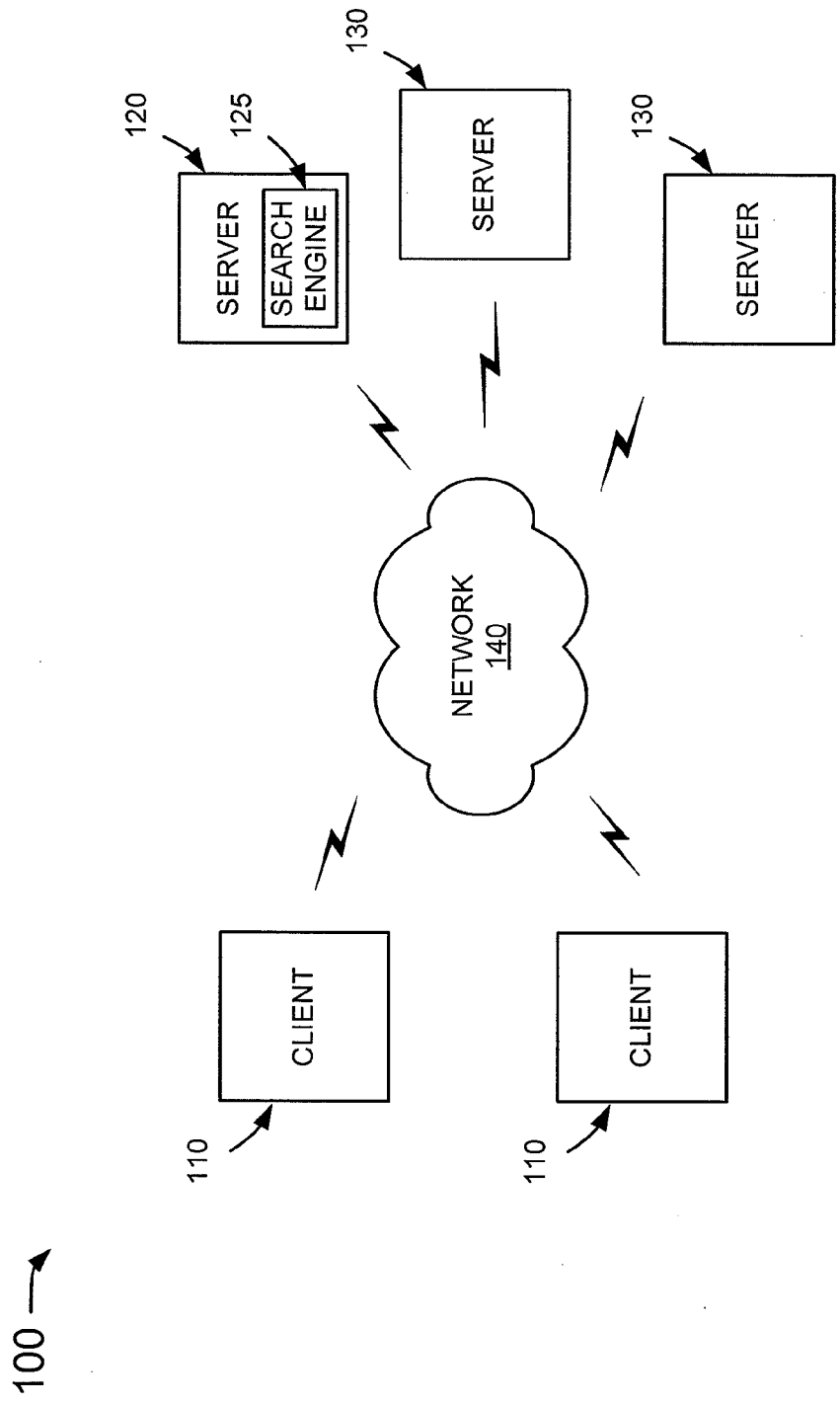
FIG. 1 is an exemplary diagram of a system in which systems and methods consistent with the principles of the invention may be implemented.

FIG. 1 is an exemplary diagram of a system 100 in which systems and methods consistent with the principles of the invention may be implemented. System 100 may include multiple clients 110 connected to servers 120 and 130 via a network 140. Network 140 may include a local area network (LAN), a wide area network (WAN), a telephone network, such as the Public Switched Telephone Network (PSTN), an intranet, the Internet, a similar or dissimilar network, or a combination of networks. Two clients 110 and three servers 120/130 have been illustrated as connected to network 140 in FIG. 1 for simplicity. In practice, there may be more or fewer clients 110 and/or servers 120/130. Also, in some instances, a client 110 may perform the functions of a server 120/130 and a server 120/130 may perform the functions of a client 110.

Clients 110 may include devices, such as wireless telephones, personal computers, personal digital assistants (PDAs), lap tops, etc., threads or processes running on these devices, and/or objects executable by these devices. Servers 120/130 may include server devices, threads, and/or objects that operate upon, search, or maintain documents in a manner consistent with the principles of the invention. Clients 110 and servers 120/130 may connect to network 140 via wired, wireless, or optical connections.

In an implementation consistent with the principles of the invention, server 120 may include a search engine 125 usable by clients 110. Servers 130 may store objects (or web documents) accessible by clients 110. Servers 130 may also include search engines that allow clients 110 to search for and retrieve documents over network 140.

Exemplary Server Configuration

Figure 2:
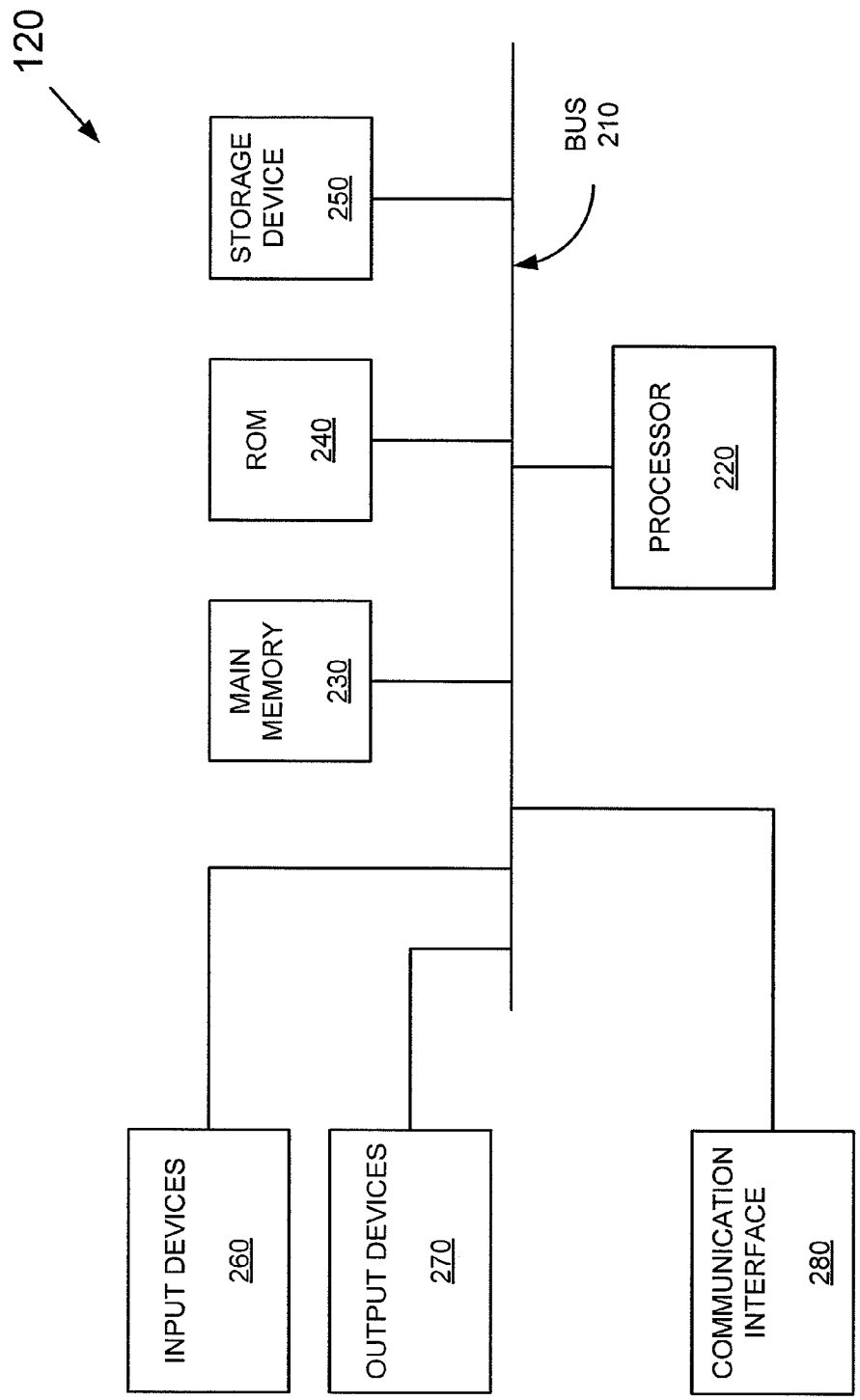
FIG. 2 is an exemplary diagram of the server of FIG. 1 in an implementation consistent with the principles of the invention.

FIG. 2 is an exemplary diagram of server 120 in an implementation consistent with the principles of the invention. Clients 110 and servers 130 may be similarly configured. Server 120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of server 120.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input devices 260 may include one or more conventional mechanisms that permit a user to input information to server 120, such as a keyboard, a mouse, a pen, one or more biometric mechanisms, such as a voice recognition device, etc. Output devices 270 may include one or more conventional mechanisms that output information to the user, including a display, a printer, a speaker, etc. Communication interface 280 may include any transceiver-like mechanism that enables server 120 to communicate with other devices and/or systems. For example, communication interface 280 may include mechanisms for communicating with another device or system via a network, such as network 140.

As will be described in detail below, server 120, consistent with the principles of the invention, may detect commercial queries and tailor the number of advertisements that are provided (or displayed) to the user when a query is commercial. Server 120 may perform these operations in response to processor 220 executing software instructions contained in a computer-readable medium, such as memory 230. A computer-readable medium may be defined as one or more memory devices and/or carrier waves. The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, the invention is not limited to any specific combination of hardware circuitry and software.

Server 120, consistent with the principles of the invention, may be associated with one or more databases. The databases may be stored at server 120 (e.g., in memory 230) or externally from server 120.

Figure 3A:
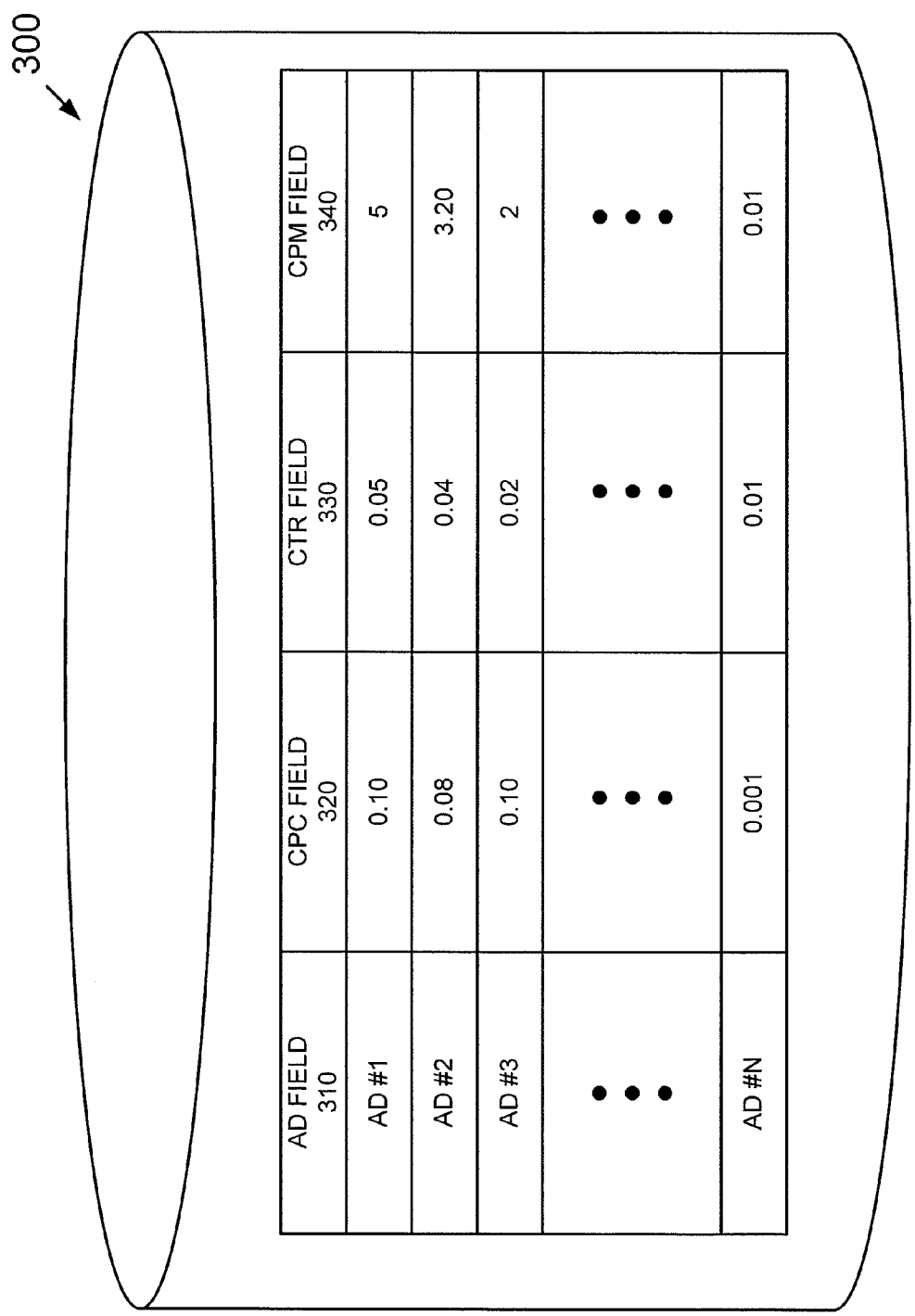
FIGS. 3A and 3B are exemplary diagrams of databases that may be associated with the server of FIG. 2 in an implementation consistent with the principles of the invention.
Figure 3B:
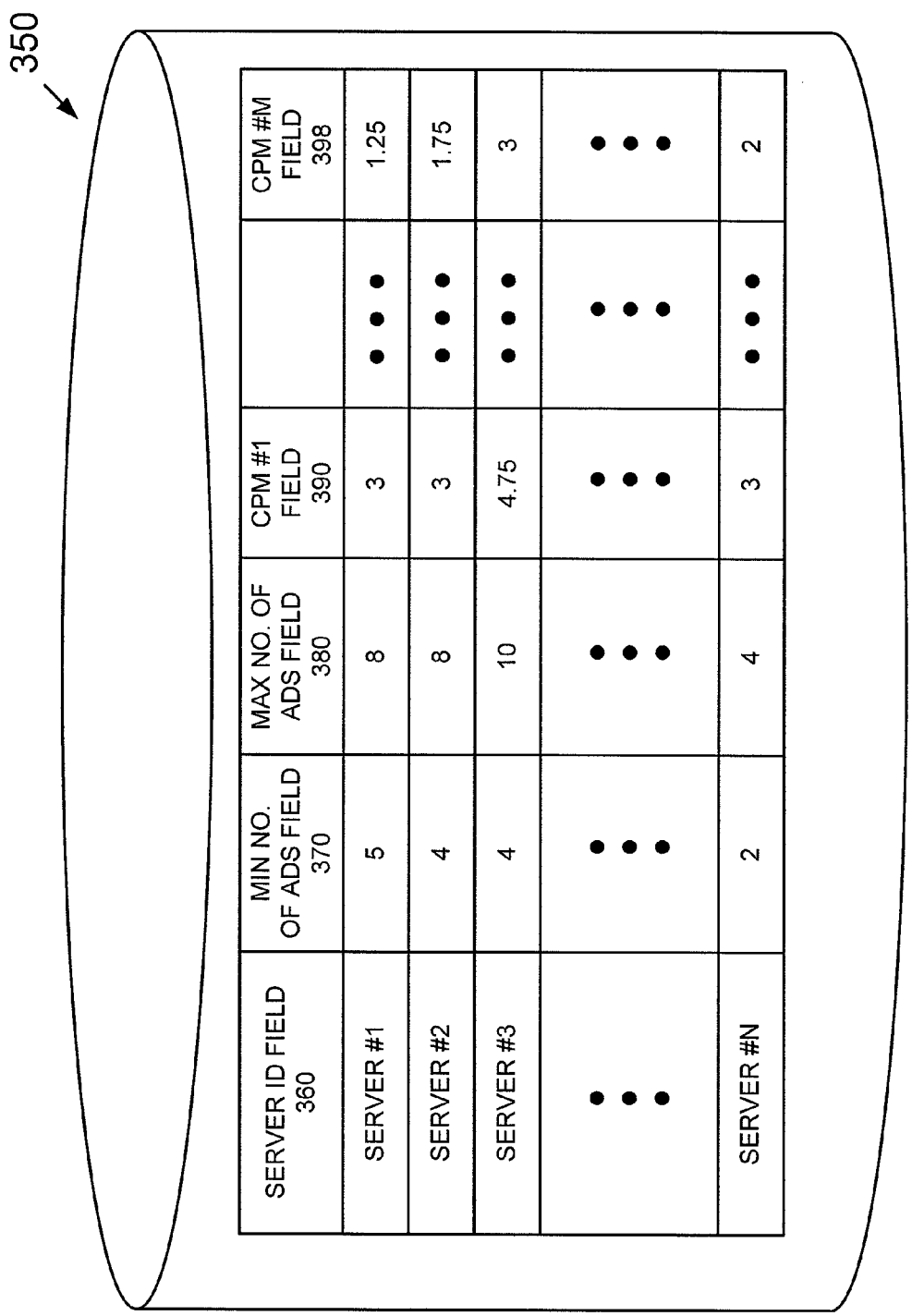

FIGS. 3A and 3B are exemplary diagrams of databases 300 and 350 that may be associated with server 120 in an implementation consistent with the principles of the invention. While only two databases are described below, it will be appreciated that server 120 may be associated with one or more additional databases (not shown) stored locally at server 120 or distributed throughout network 140.

As illustrated, database 300 (FIG. 3A) may include an advertisement (or "ad") field 310, an optional expected revenue per click (CPC) field 320, an optional click-through rate (CTR) field 330, and an optional estimated revenue per thousand instances of an advertisement display (CPM) field 340. Ad field 310 may identify advertising links to be provided to users, for example, in response to received user queries. CPC field 320 may store a value, for each advertising link in ad field 310, representing an expected amount of revenue that would be received every time that a user selects (or clicks) the advertising link. For example, assume that an advertiser associated with advertising link #3 (FIG. 3A) is willing to pay 10 cents each time that a user clicks advertising link #3. The CPC value for advertising link #3 would be $0.10. In one implementation, CPC field 330 may store the value in dollars.

CTR field 340 may store a value, for each advertising link in ad field 310, representing the click through rate of the advertising link. The click through rate represents the number of clicks on an advertising link divided by the number of times that the advertising link is viewed. As illustrated in FIG. 3A, for example, if advertising link #3 is displayed 1000 times and clicked 20 times, the CTR value for advertising link #3 would be 0.02.

CPM field 320 may store a value, for each advertising link identified in ad field 310, representing an expected amount of revenue that would be received from an advertiser per one thousand instances of the advertiser's advertising link being displayed. CPM field 320 may, for example, store the value in dollars. The CPM values may be provided to server 120 from, for example, the advertisers associated with the advertising links in ad field 310 or may be determined based at least in part on other parameters. In one implementation, for example, the CPM value may be determined as follows:

$$CPM=CPC*CTR*1000.$$

In the example above, the CPM for advertising link #3 would be $2 (i.e., $0.10*.02*1000=$2). Other techniques for determining the CPM value for an advertising link may alternatively be used. For example, the CPM value could alternatively be determined by multiplying the number of clicks per one thousand impressions (i.e., displays of the advertising link) by the CPC value for that advertising link. The CPM values may alternatively be determined based at least in part on other parameters, such as a cost per acquisition parameter, that may, for example, be provided by the advertiser.

It will be appreciated that database 300 may include additional fields than those illustrated in FIG. 3A. For example, in one implementation, database 300 may include a field that stores one or more key words for each advertising link identified in ad field 310. In this way, advertising links in ad field 310 may be matched to user queries.

Database 350 (FIG. 3B) may include an server identification (ID) field 360, a minimum (MIN) number (NO) of advertising links field 370, a maximum (MAX) number of advertising links field 380, and a number of CPM fields 390-398. Server ID field 360 may store a value that uniquely identifies a particular site that provides advertising links to users. Minimum number of advertising links field 370 may store a value representing the minimum number of advertising links to be provided to a user when the user submits a query. The minimum number may be a positive integer greater than or equal to zero. The maximum number of advertising links field 380 may store a value representing the maximum number of advertising links to be provided to a user when the user submits a commercial query. The maximum number may be a positive integer that is greater than or equal to the value in minimum number of advertising links field 370. The minimum and maximum numbers may be selected, for example, based at least in part on the amount of room available on the web page for displaying advertisement links.

CPM fields 390-398 may store M CPM threshold values, where M is the difference between the maximum number of advertising links in field 380 and the minimum number of advertising links in field 370. For example, as illustrated in FIG. 3B, a minimum of 5 advertising links may be displayed in response to a commercial query for server #1 and a maximum of 8 advertising links may be displayed. Therefore, server #1 may be associated with 3 CPM threshold values, one for each of the possible additional advertising link positions. As will be described in detail below, server 120 may use the CPM threshold values in CPM fields 390-398 in determining whether to display additional advertising links to a user.

It will be appreciated that database 350 may include additional fields than those illustrated in FIG. 3B. For example, in one implementation, database 350 may include a field that stores a group of CPC values and CTR values for each advertising link identified in ad field 310.

Exemplary Processing

Implementations consistent with the principles of the invention provide a minimum number of advertising links to users. Additional advertising links may be provided to a user on a per query basis if, for example, the additional advertising links contribute significant additional revenue. It is generally recognized in search-based advertising that 80% of the total revenue comes from those 20% of advertising links that generate very high click-throughs and CPCs. In one implementation, advertising links that contribute significant revenue are identified using a CPM threshold value.

Figure 4:
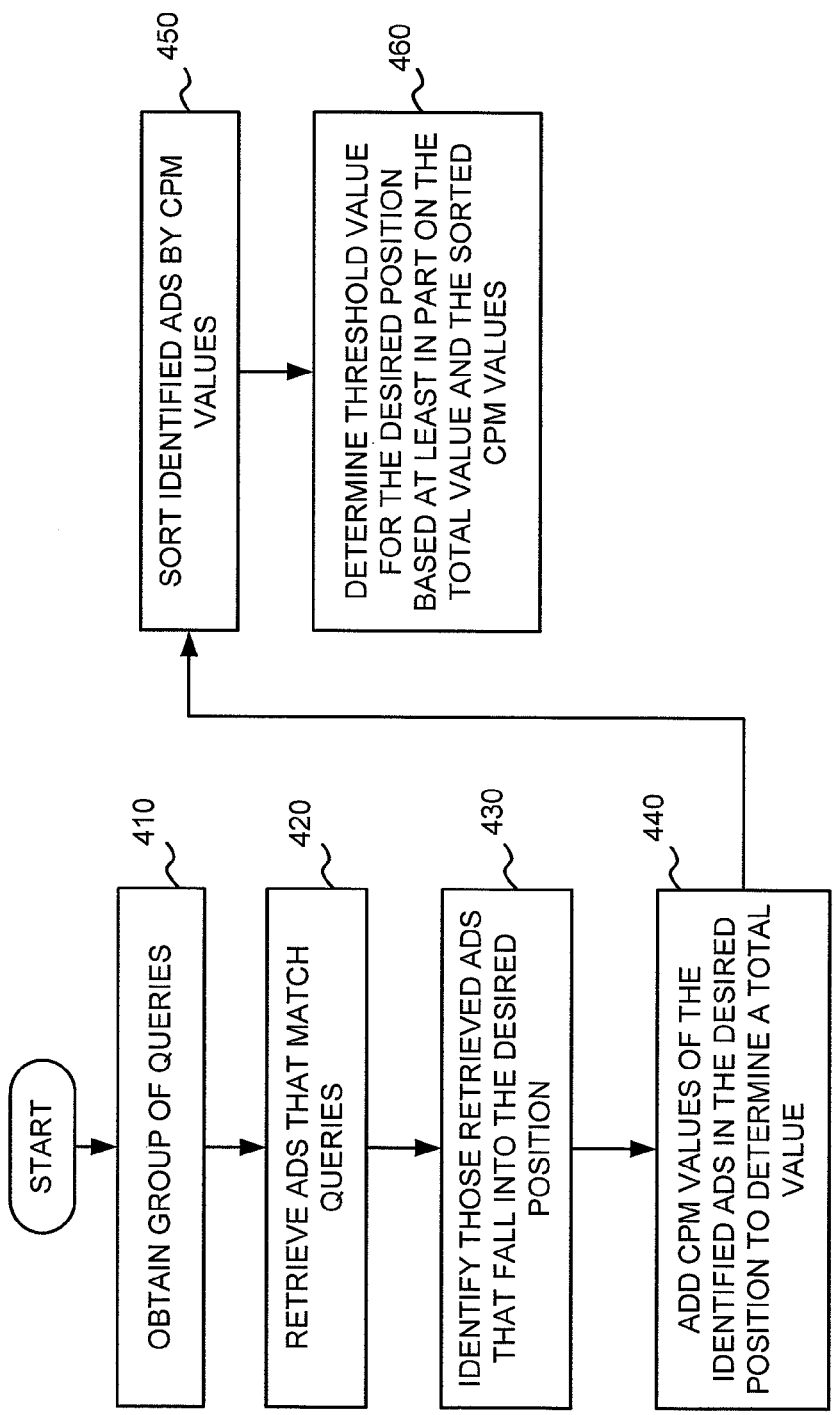
FIG. 4 is a flow chart of an exemplary process for generating an advertising position threshold in an implementation consistent with the principles of the invention.

FIG. 4 is a flow chart of an exemplary process for generating an advertising position threshold for a server, such as server #1 in FIG. 3B, in an implementation consistent with the principles of the invention. The process described below may be performed automatically by, for example, server 120 or manually by a human operator. In alternative implementations, parts of the process described below may be performed automatically while other parts may be performed manually. Moreover, the process may be performed once or at predetermined intervals.

Processing may begin by obtaining a group of queries received by server #1 (act 410). The queries may include those queries received at server #1 over a predetermined period of time (e.g., one week or one month). In one implementation, the group of queries may include 100,000 or more queries. For each query, server 120 may retrieve those advertising links from, for example, database 300, that are relevant to the particular query (act 420). Key word matching (or other techniques) may be used to identify those advertising links that are relevant to a particular query. Server 120 may then rank the advertising links that relate to each query to obtain a ranked list of advertising links for the query. The ranking may be based, for example, at least in part on the CPC values, CTR values, and/or CPM values associated with the advertising links.

Based at least in part on the rankings, server 120 may identify those advertising links that fall into the desired position in the ranked lists of advertising links (act 430). For example, for server #1 in FIG. 3B, a minimum of 5 advertising links may be displayed each time a query is received. Additional advertising links may also be displayed up to a maximum of 8 advertising links. Therefore, advertising positions 6, 7, and 8 are variable for server #1. In this situation, server 120 may begin by identifying all advertising links that fall into position 6 in the ranked lists of advertising links. It will be appreciated that the identified advertising links may be totally unrelated, except for the fact that they were all ranked $6^{th}$ in the ranked lists of advertising links.

Server 120 may then add the CPM values from field 320 (FIG. 3A) for all of the advertising links identified to fall into the desired position (e.g., the $6^{th}$ position) in the ranked lists to obtain a total value (act 440). For explanatory purposes, assume that the total value is $10. As set forth above, it is generally recognized in search-based advertising that 80% of the total revenue for a search engine comes from those 20% of advertising links that generate very high click-throughs and CPCs. Therefore, it is desirable to determine the advertising links that contribute 80% of the total revenue. In the above example, 80% of the total revenue for the $6^{th}$ position (i.e., $10) is $8.

Server 120 may then sort the advertising links that have been identified as falling into the desired position in descending order based at least in part on the CPM values associated with the advertising links (act 450). Assume, for explanatory purposes, that server 120 generates the sorted list illustrated in Table 1.

TABLE 1

| Sorted list of Advertising Links | |
| --- | --- |
| AD 1 | $5.00 |
| AD 2 | $3.00 |
| AD 3 | $0.35 |
| AD 4 | $0.25 |
| . | . |
| . | . |
| . | . |
| Total | $10 |

Server 120 may determine a CPM threshold value for the desired position based at least in part on the total value and the CPM values associated with the advertising links that fall into the desired position (act 460). For example, server 120 may start at the top of the sorted list (i.e., at the advertising link associated with the highest CPM value) and add up the CPM values until 80% of the total revenue for the desired position is reached (i.e., $8 in the example above). Server 120 may, therefore, stop adding the CPM values when $8 is reached. For the list identified in Table 1, server 120 may stop adding CPM values after the second advertising link (i.e., AD 2) since $5+$3=$8.

Server 120 may then assign the CPM value of the last advertising link that is added in to reach $8 as the CPM threshold value for that position. In the example above, the CPM value for position 6 would be $3. Server 120 may store the CPM threshold value in database 350 (e.g., in field 390). Server 120 may thereafter determine CPM threshold values in a manner similar to that described above for the other variable positions (i.e., positions 7 and 8) and store these threshold values in database 350.

Figure 5:
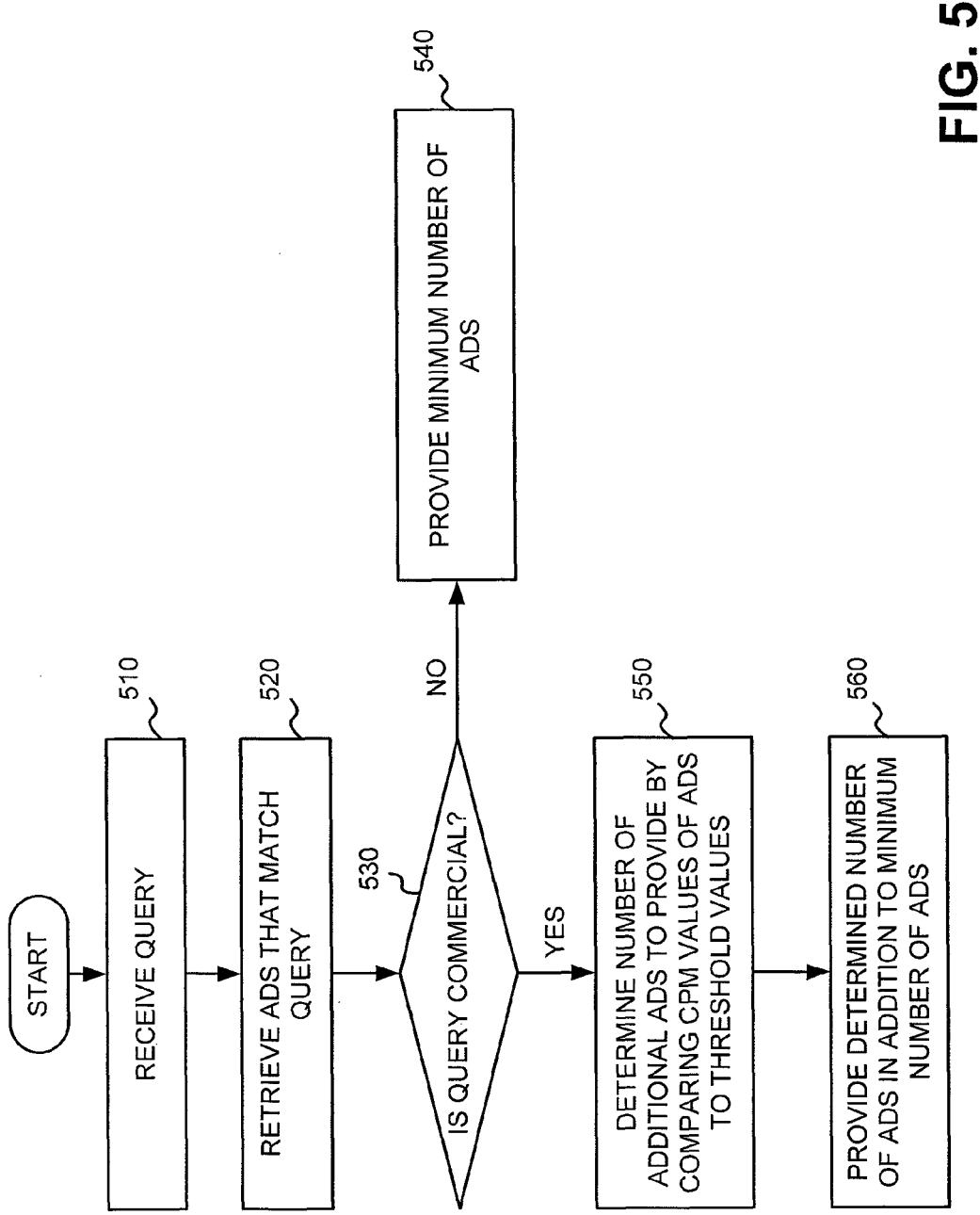
FIG. 5 is a flow chart of an exemplary process for providing advertisements in an implementation consistent with the principles of the invention.

FIG. 5 is a flow chart of an exemplary process for providing advertising links in an implementation consistent with the principles of the invention. The process described below may be performed automatically by, for example, server 120 or manually by a human operator. In alternative implementations, parts of the process described below may be performed automatically while other parts may be performed manually.

Processing may begin with server 120 receiving a query (act 510). The query may be received from a client 110 or another server 130. Server 120 may retrieve a pool of advertising links that are relevant to the query (act 520). Key word matching (or other techniques) may be used to identify those advertising links that are relevant to the query. Server 120 may then rank the advertising links that relate to the query to obtain a ranked list of advertising links for the query. Server 120 may rank the advertising links based, for example, at least in part on the CPC values, CTR values, and/or CPM values associated with the advertising links.

Server 120 may determine if the query is a commercial query (act 530). Server 120 may determine that a query is commercial based at least in part on the revenue generated by the advertising links associated with the query. If the advertising links relevant to the query are very high revenue producing advertising links, then server 120 may consider the query to be commercial. For example, in one implementation, server 120 may add the CPM values associated with the retrieved advertising links. If the total value of CPM values exceeds a configurable threshold value, then the server 120 may determine that the query is commercial. As an example, assume that the threshold value is $10. If the sum of the CPM values associated with the retrieved advertising links exceeds $10, then server 120 would determine that the query is commercial.

If server 120 determines that the query is not commercial (act 530), server 120 may provide a minimum number of advertising links (act 540). For example, as illustrated in FIG. 3B, server #1 may allow for a minimum of five advertising links to be displayed. If more than five advertising links match a given query, the highest five ranking advertising links may be provided. It will be appreciated that in some instances, less than the minimum number of advertising links may be provided. For example, if only two advertising links match a given query, then the two matching advertising links may be provided.

If server 120 determines that the query is commercial (act 530), server 120 may determine the number of additional advertising links to display (i.e., in addition to the minimum number of advertising links) (act 550). Server 120 may first exclude the highest ranking advertising links up to the minimum number since these links will automatically be provided. For example, server #1 has indicated that a minimum of five advertising links should be provided. In this situation, server 120 may exclude the 5 highest ranking advertising links Server 120 may then sort the remaining advertising links in descending based at least in part on their CPM values (if the advertising links are not already sorted by CPM values).

To determine whether additional advertising links should be provided, server 120 may, for example, compare the CPM value associated with the highest ranking advertising link in the sorted list to the CPM threshold value for that position. For example, server #1 (FIG. 3B) has indicated that up to three additional advertising links may be provided if the additional advertising links contribute significant revenue. Server 120 may compare the first CPM threshold value (from field 390, FIG. 3B) to the CPM value associated with the highest ranking advertising link in the sorted list. If the CPM value associated with the highest ranking advertising link in the sorted list equals or exceeds the CPM threshold value, then server 120 may determine that this highest ranking advertising link should be provided. In a similar manner, server 120 may compare the CPM values associated with the next two highest ranking advertising links to the respective next two CPM threshold values from database 350. Server 120 may determine that these advertising links should also be provided if their respective CPM values equal or exceed the CPM threshold values for these additional advertising positions.

If, on the other hand, the CPM value associated with the highest ranking advertising link in the sorted list does not equal or exceed the CPM value, server 120 may determine that this highest ranking advertising link should not be provided.

Once server 120 identifies any additional advertising links to be provided, server 120 may provide the minimum number of advertising links, along with the additional advertising links (act 560). In one implementation, server 120 may provide the advertising links to a client 110. In another implementation, server 120 may provide the advertising links to another server 130.

The following examples illustrate the above processing. Assume, for example, that a server is configured to display five advertising links for non-commercial queries, and up to seven advertising links for commercial queries. The server does not set a threshold for the first five advertising positions since the first five advertising positions fall under the minimum set by the server. Assume further that the CPM threshold for the sixth advertising position is $5 and the CPM threshold for the seventh advertising position is $4.

Assume that the query "Isaac Newton" is received and that there are only two advertising links relevant to that query. The server would display both advertising links since no threshold exists for the top two positions.

Assume that the query "water" is received, that there are six advertising links relevant to the query, and that the sixth advertising link is associated with a CPM value of $3. In this situation, the server would display five advertising links since the CPM value associated with the sixth advertising link does not exceed the CPM threshold for the sixth advertising position (i.e., $5).

Assume that the query "buy diamonds" is received, that there are eight advertising links relevant to the query, and the sixth and seventh advertising links are associated with CPM values of $6 and $5, respectively. In this situation, the server would display seven advertising links (i.e., the maximum number of advertising links) since the CPM value associated with the sixth advertising link exceeds the CPM threshold for the sixth advertising position (i.e., $5) and the CPM value associated with the seventh advertising link exceeds the CPM threshold for the seventh advertising position (i.e., $4).

It will be appreciated that, as an alternative to specifying a CPM threshold value for each of the possible additional advertising position, a single CPM threshold value may be used. In this situation, the server may compare the CPM values of possible additional advertising links to the single CPM threshold value and provide any that equals or exceeds the CPM threshold value, up to the maximum number of permissible advertising links.

Alternatively, in another implementation, all advertising links whose CPM values equal or exceed the CPM threshold value may be provided without limit.

In alternative implementations consistent with the principles of the invention, server 120 may set the thresholds for determining whether to provide additional advertising links in other ways. In one alternative implementation, the threshold may be set based at least in part on the content of the query, rather than on the characteristics of the actual advertising links retrieved for that content. For example, server 120 may set a threshold that all queries containing "buy" should be provided 10 advertising links.

Figure 6:
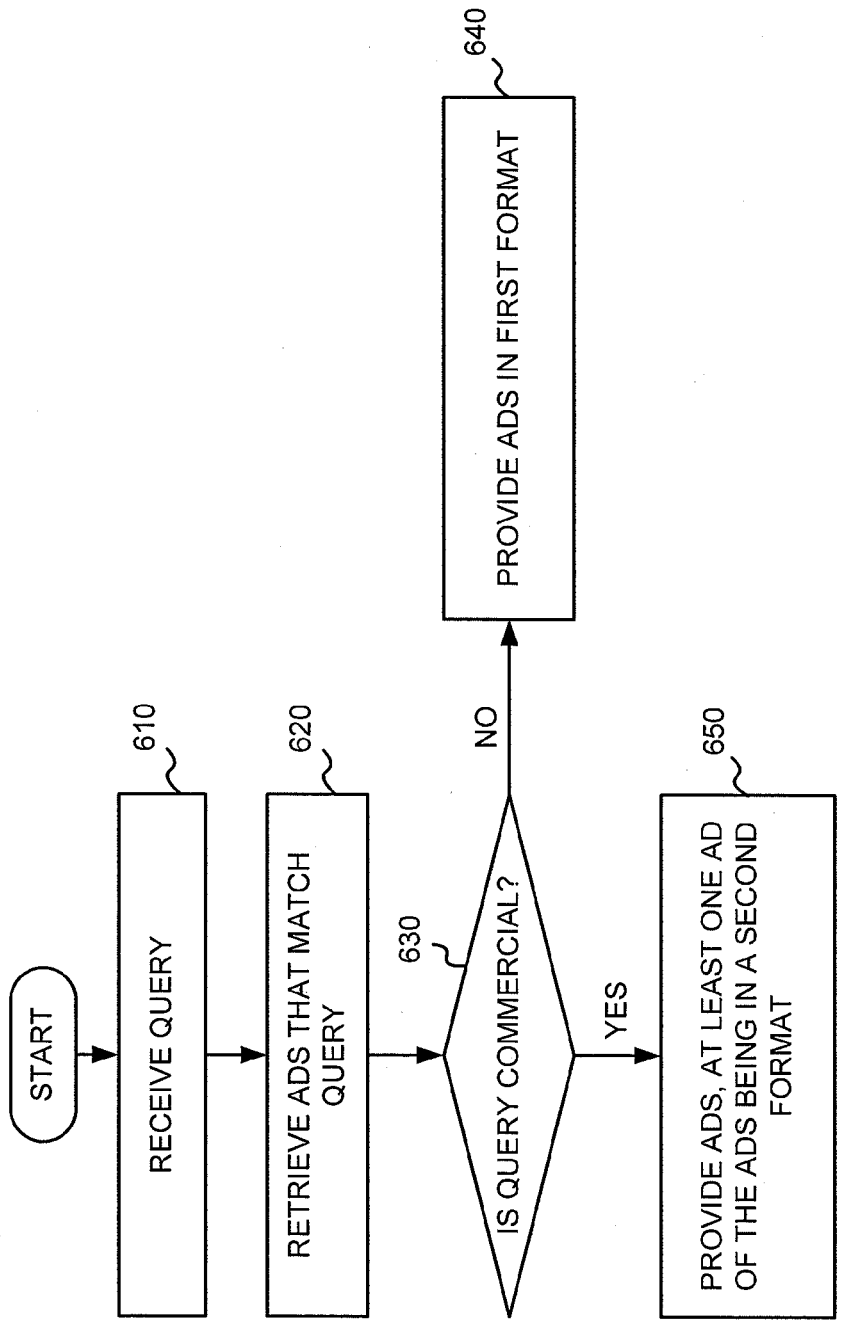
FIG. 6 is a flow chart of an exemplary process for providing advertising links in an alternative implementation consistent with the principles of the invention.

FIG. 6 is a flow chart of an exemplary process for providing advertising links in an alternative implementation consistent with the principles of the invention. It will be appreciated that the following process may be performed in conjunction with or as an alternative to the processing described above with respect to FIG. 5. Moreover, the process described below may be performed automatically by, for example, server 120 or manually by a human operator. In alternative implementations, parts of the process described below may be performed automatically while other parts may be performed manually.

Processing may begin with server 120 receiving a query (act 610). The query may be received from a client 110 or another server 130. Server 120 may retrieve a pool of advertising links that are relevant to the query (act 620). Key word matching (or other techniques) may be used to identify those advertising links that are relevant to the query. Server 120 may then rank the advertising links that relate to the query to obtain a ranked list of advertising links for the query. Server 120 may rank the advertising links based, for example, at least in part on the CPC values, CTR values, and/or CPM values associated with the advertising links.

Server 120 may determine if the query is a commercial query (act 630). Server 120 may determine that a query is commercial based at least in part on the revenue generated by the advertising links associated with the query. If the advertising links relevant to the query are very high revenue producing advertising links, then server 120 may consider the query to be commercial. For example, in one implementation, server 120 may add the CPM values associated with the retrieved advertising links. If the total value of CPM values exceeds a configurable threshold value, then the server 120 may determine that the query is commercial. As an example, assume that the threshold value is $10. If the sum of the CPM values associated with the retrieved advertising links exceeds $10, then server 120 would determine that the query is commercial.

If server 120 determines that the query is not commercial (act 630), server 120 may provide a number of advertising links in a first format (act 640). The first format may be a less prominent format for displaying advertising links. For example, server 120 may provide the advertising links in non-bolded text, in a narrow or smaller font, or other ways to make the advertising links less prominent.

Figure 7:
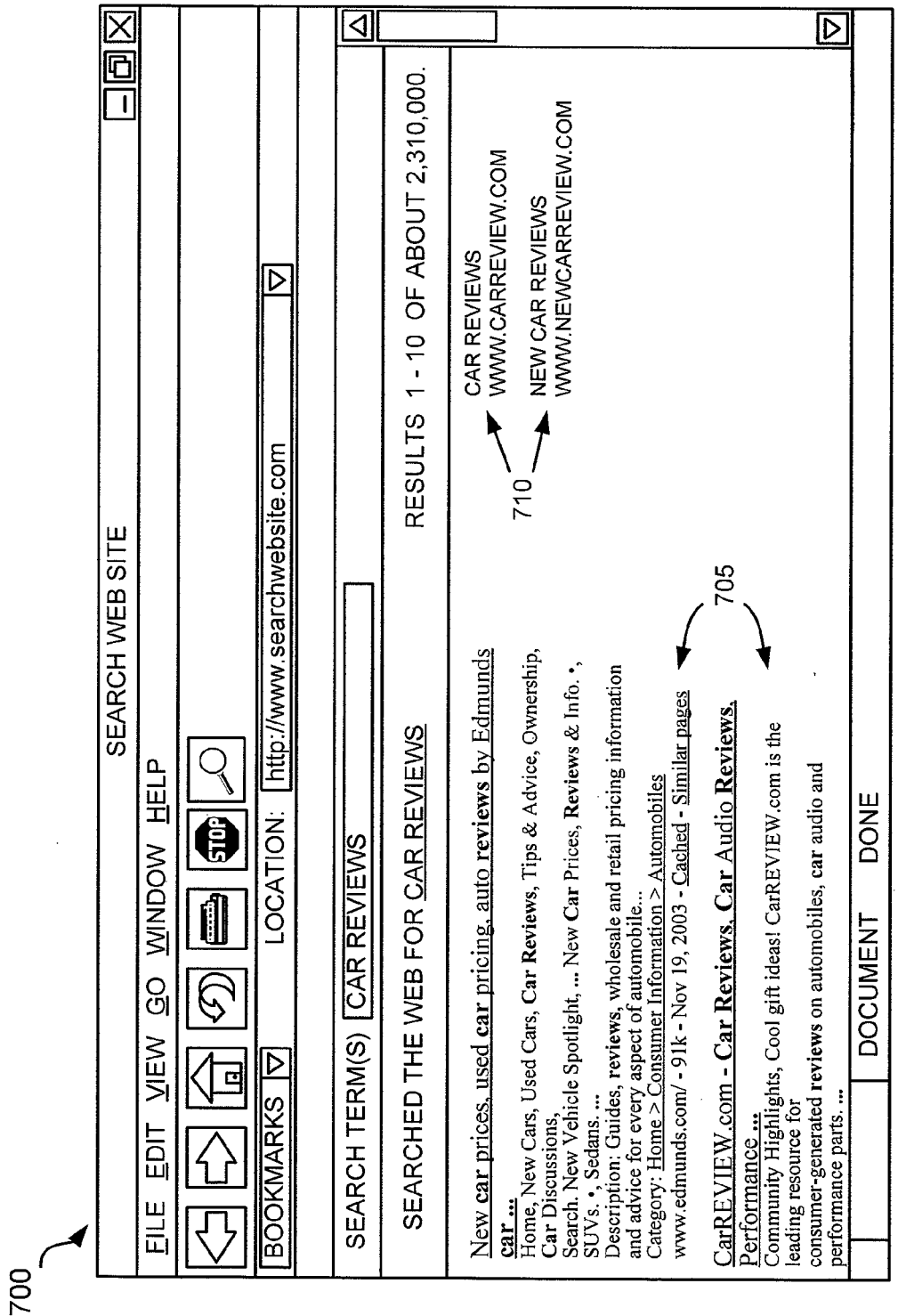
FIG. 7 illustrates an exemplary graphical user interface that may be provided to a user in an implementation consistent with the principles of the invention when a non-commercial search query is detected.

FIG. 7 illustrates an exemplary graphical user interface 700 that may be provided to a user in an implementation consistent with the principles of the invention when a non-commercial search query is detected. As illustrated, in response to a search for "car reviews," server 120 may provide a list of links 705 to web sites that relate to car reviews and possibly one or more advertising links 710. Since the search query "car reviews" is determined to be non-commercial, server 120 may cause advertising links 710 to be less prominently displayed. As illustrated, advertising links 710 may, for example, be provided in narrow font and non-bolded.

Returning to FIG. 6, if server 120 determines that the query is commercial (act 630), server 120 may provide one or more of a number of advertising links in a second format (act 650). The second format may be a more prominent format for displaying advertising links. For example, server 120 may provide the advertising links in bolded text, make the advertising links wider or enhance them in some other way.

FIG. 8 illustrates an exemplary graphical user interface 800 that may be provided to a user in an implementation consistent with the principles of the invention when a commercial query is detected. As illustrated, in response to a search for "buy car," server 120 may provide a list of links 805 to web sites that relate to the search query and advertising links 810. Since the query "buy car" is determined to be commercial, server 120 may cause advertising links 810 to be more prominently displayed. As illustrated, advertising links 810 may, for example, be provided in bolded text, a larger font size, etc.

In other implementations, the advertising links may be provided in multiple different formats when a query is determined to be commercial. For example, the highest ranking advertising link may be displayed in a first format, the next highest ranking advertising link(s) may be displayed in a second format, while the rest of the advertising links may be displayed in a third format. It will be appreciated that many other variations are possible. In one implementation, each advertising link may be associated with a display format in database 300. Server 120 may permit the advertiser to select the format in which the advertiser's advertising link is displayed or the selection of display format may be made by server 120.

CONCLUSION

Implementations consistent with the principles of the invention intelligently select when to provide additional advertising links to a user. For example, when a query is determined to be commercial in nature, additional advertising links may be displayed provided that these links are determined to contribute significant additional revenue. Alternatively, or in addition, the formatting of the advertising links may be changed when a query is determined to be commercial in nature.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, the above-described functions need not be performed by server 120. In other implementations, one or more of the acts described in FIGS. 5 and 6 may be performed by a client 110 or another server 130. For example, a browser assistant (i.e., software that operates in conjunction with a conventional web browser) may perform one or more of the acts described with respect to the processes of FIGS. 5 and 6.

Moreover, while the above processing based advertising link provisioning on CPM values associated with the advertising links, implementations consistent with the principles of the invention are not so limited. For example, additional advertising link provisioning may alternatively be based at least in part on the CPC values associated with the advertising links.

While series of acts have been described with regard to FIGS. 4-6, the order of the acts may be varied in other implementations consistent with the present invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

What is claimed is:

1. A system comprising:
a memory to store instructions; and
a processor to execute the instructions to:
receive a query,
retrieve advertising links based on the query, each advertising link, in the retrieved advertising links, being associated with a value that is based on an estimated revenue associated with the advertising link,
compare the values, associated with the retrieved advertising links, to a threshold,
determine whether the query is commercial based on a result of comparing the values to the threshold,
provide a first quantity of advertising links, from the retrieved advertising links, when the query is not commercial,
adjust the first quantity of advertising links when the query is commercial, and
provide the adjusted first quantity of advertising links when the query is commercial.

2. The system of claim 1,
where, when retrieving the advertising links, the processor is to:
retrieve the advertising links in response to receiving the query.

3. The system of claim 1, where, when providing the first quantity of advertising links, the processor is to:
select one or more advertising links, from the retrieved advertising links, having highest values, and
provide the selected one or more advertising links with a result of the query.

4. The system of claim 1, where, when adjusting the first quantity of advertising links when the query is commercial, the processor is to:
select a second quantity of advertising links, from the retrieved advertising links, in addition to the first quantity of advertising links, and
where, when providing the adjusted first quantity of advertising links, the processor is further to:
provide, with results of the query, the first quantity of advertising links and the selected second quantity of advertising links.

5. The system of claim 4, where, when selecting the second quantity of advertising links, the processor is further to:
sort a number of advertising links, of the retrieved advertising links, based on the values associated with the number of advertising links,
where the sorted number of advertising links does not include the first quantity of advertising links, and
select the second quantity of advertising links from the sorted number of advertising links.

6. The system of claim 1, where, when determining whether the query is commercial, the processor is further to:
add the values to obtain a total value,
compare the obtained total value to the threshold, and
determine whether the total value equals or exceeds the threshold.

7. The system of claim 6, where the processor is further to:
determine that the query is commercial when the total value equals or exceeds the threshold, and
determine that the query is not commercial when the total value does not exceed or is not equal to the threshold.

8. The system of claim 1, where the processor is further to:
provide the first quantity of advertising links in a first display format, and
provide one or more of the adjusted first quantity of advertising links in a second display format that is different than the first display format.

9. A method comprising:
receiving, by one or more server devices, a query;
determining, by the one or more server devices, whether the query is commercial based on values associated with a plurality of advertising links that are associated with the query,
where each of the values is associated with an estimated revenue associated with a corresponding advertising link;
selecting, by the one or more server devices, a first quantity of advertising links, from the plurality of advertising links, when the query is not commercial;
selecting, by the one or more server devices and in addition to the selected first quantity of advertising links, a second quantity of advertising links, from the plurality of advertising links, when the query is commercial;
providing the selected first quantity of advertising links when the query is not commercial; and
providing the selected first quantity of advertising links and the selected second quantity of advertising links when the query is commercial.

10. The method of claim 9, where selecting the second quantity of advertising links includes:
   sorting one or more of the plurality of advertising links based on one or more of the values associated with the one or more of the plurality of advertising links; and
   selecting at least one of the plurality of advertising links from the sorted one or more of the plurality of advertising links.

11. The method of claim 9, further comprising:
   identifying the first quantity of advertising links when the query is commercial; and
   determining whether to provide the second quantity of advertising links in addition to the identified first quantity of advertising links when the query is commercial.

12. The method of claim 9, further comprising:
   comparing the values to a threshold; and
   determining whether the query is commercial based on comparing the values to the threshold.

13. The method of claim 12, further comprising:
   determining that the query is commercial when the values exceed or are equal to the threshold, and
   determining that the query is not commercial when the values are less than the threshold.

14. The method of claim 13, further comprising:
   providing the selected first quantity of advertising links in a first format when the query is not commercial; and
   providing one or more of the selected first quantity of advertising links and the selected second quantity of advertising links in a second format different than the first format, when the query is commercial.

15. The method of claim 14, where providing the selected first quantity of advertising links in the first format includes:
   providing the selected first quantity of advertising links in a format that is less prominent than the second format.

16. The method of claim 9, where selecting the first quantity of advertising links includes:
   sorting a number of advertising links, of the plurality advertising links, based on the values associated with the number of advertising links, and
   selecting the first quantity of advertising links from the sorted number of advertising links, where the selected first quantity of advertising links correspond to advertising links having values that are highest among the sorted number advertising links.

17. A non-transitory computer-readable memory device including instructions executable by a processor, the instructions comprising:
   one or more instructions to receive a query;
   one or more instructions to determine whether the query is commercial based on values associated with advertising links that are associated with the query,
   where the one or more instructions to determine whether the query is commercial includes:
      one or more instructions to compare the values to a threshold,
      where each of the values is based on an estimated revenue associated with a corresponding advertising link, and
      one or more instructions to determine whether the query is commercial based on a result of comparing the values to the threshold;
   one or more instructions to provide, in a first format, a first quantity of the advertising links query when the query is not commercial;
   one or more instructions to adjust the first quantity of the advertising links when the query is commercial; and
   one or more instructions to provide, in a second format, one or more of the adjusted first quantity of the advertising links, the second format being different than the first format.

18. The non-transitory computer-readable memory device of claim 17, where the instructions further comprise:
   one or more instructions to add the values to obtain a total value;
   one or more instructions to determine whether the total value equals or exceeds a threshold;
   one or more instructions to determine that the query is commercial when the total value equals or exceeds the threshold; and
   one or more instructions to determine that the query is not commercial when the total value is less than the threshold.

19. The non-transitory computer-readable memory device of claim 17, where the one or more instructions to adjust the first quantity of the advertising links include:
   one or more instructions to identify a second quantity of the advertising links, in addition to the first quantity of the advertising links, when the query is commercial, and
   where the one or more instructions to provide, in the second format, the one or more of the adjusted first quantity of the advertising links include:
      one or more instructions to provide, in the second format, the one or more of the first quantity of the advertising links and the second quantity of the advertising links.

20. The non-transitory computer-readable memory device of claim 17, where one or more instructions to provide, in the first format, the first quantity of the advertising links query include:
   one or more instructions to provide the first quantity of the advertising links query in a format that is less prominent than the second format.

* * * * *